(12) United States Patent
Schmidt et al.

(10) Patent No.: US 12,118,021 B1
(45) Date of Patent: Oct. 15, 2024

(54) RESEARCH AND INVESTIGATION SYSTEMS INCORPORATING GRAPH DATABASES

(71) Applicant: 1nteger, LLC, Los Angeles, CA (US)

(72) Inventors: Benjamin Schmidt, Los Angeles, CA (US); David Richard Elam, Los Angeles, CA (US); Darci Kovacs, Los Angeles, CA (US)

(73) Assignee: Integer, LLC, Los Angeles, CA (US)

( * ) Notice: Subject to any disclaimer, the term of this patent is extended or adjusted under 35 U.S.C. 154(b) by 0 days.

(21) Appl. No.: 18/622,880

(22) Filed: Mar. 30, 2024

(51) Int. Cl.
| | | |
|---|---|---|
| *G06F 16/28* | (2019.01) | |
| *G06F 3/0482* | (2013.01) | |
| *G06F 16/248* | (2019.01) | |

(52) U.S. Cl.
CPC .......... *G06F 16/287* (2019.01); *G06F 3/0482* (2013.01); *G06F 16/248* (2019.01)

(58) Field of Classification Search
CPC ............... G06F 16/248; G06F 3/0482; G06F 16/24575; G06F 3/048; G06Q 30/0621; G06Q 30/0631; G06Q 50/04; G06Q 50/10; G16H 20/60; G09B 19/0092; H04M 1/72403; H04M 1/725
See application file for complete search history.

(56) References Cited

U.S. PATENT DOCUMENTS

| | | | |
|---|---|---|---|
| 9,947,119 B2 | 4/2018 | Grandhi et al. | |
| 10,127,511 B1* | 11/2018 | Epstein | G06Q 30/018 |
| | | | 707/807 |
| 10,365,791 B2 | 7/2019 | Spaulding et al. | |
| 10,509,844 B1* | 12/2019 | McIntyre | G06F 40/205 |
| | | | 705/2 |
| 10,558,679 B2 | 2/2020 | Chiu et al. | |
| 10,613,722 B1 | 4/2020 | Philipson | |

(Continued)

FOREIGN PATENT DOCUMENTS

CN 115470349 12/2022

OTHER PUBLICATIONS

ASK Design Blog, "Cropping Thumbnails in WordPress," 12 pages (2022) available online: <https://www.askdesign.biz/blog/2022/08/cropping-thumbnails-in-wordpress/>.

(Continued)

*Primary Examiner* — Yuk Ting Choi
(74) *Attorney, Agent, or Firm* — Fox Rothschild LLP

(57) ABSTRACT

Data visualization systems and methods are disclosed. A method includes providing an interactive visual workspace in connection with a graph database. The workspace allows a user to interactively add a graph including one or more nodes and edges from the graph database to the workspace whereby the workspace allows the user to explore relationships among nodes, wherein the workspace provides an opportunity to make a user selection of a portion of the displayed graph, and wherein each user selection defines an individual subgraph of interest, wherein each subgraph includes one or more nodes and associated edges and properties. The method further includes receiving input from the user defining a parameter that controls an interrelationship between the individual subgraphs of interest and displaying multiple display regions configured to each provide a visual representation of a corresponding single one of the subgraphs according to the parameter.

19 Claims, 9 Drawing Sheets

(56) References Cited

U.S. PATENT DOCUMENTS

| | | | |
|---|---|---|---|
| 10,997,541 B2* | 5/2021 | Epstein | G06Q 40/08 |
| | | | 707/807 |
| 11,423,082 B2 | 8/2022 | Vikhe et al. | |
| 11,474,975 B2 | 10/2022 | Willard et al. | |
| 11,550,455 B2 | 1/2023 | Rossi et al. | |
| 11,899,673 B2* | 2/2024 | Vadranapu | G06F 9/451 |
| | | | 707/807 |
| 2014/0189650 A1* | 7/2014 | Gounares | G06F 11/3636 |
| | | | 717/125 |
| 2014/0278517 A1* | 9/2014 | Patel | G06Q 10/0637 |
| | | | 705/2 |
| 2019/0121801 A1 | 4/2019 | Jethwa et al. | |
| 2021/0255748 A1* | 8/2021 | Rickard | G06F 3/0484 |
| | | | 707/807 |
| 2022/0292509 A1 | 9/2022 | Galka | |
| 2023/0004889 A1* | 1/2023 | Epstein | G06Q 50/265 |
| | | | 707/807 |
| 2023/0108560 A1* | 4/2023 | Wang | G06F 16/9024 |
| | | | 717/109 |
| 2023/0252006 A1* | 8/2023 | Barlew | G06T 11/206 |
| | | | 707/807 |

OTHER PUBLICATIONS

Demtec, "Graphlytic: Features and how it works," 20 pages (2023) available online: <https://graphlytic.biz/features>.

Elasticsearch B.V., "Graph: Kibana Guide [8.8]," 5 pages (2023) available online: <https://www.elastic.co/guide/en/kibana/current/xpack-graph.html>.

Fu et al., "TS-Extractor: large graph exploration via subgraph extraction based on topological and semantic information," J. Vis., 24, pp. 173-190 (2021).

Graph Commons, "Harness the intelligence of your networks," 9 pages (2022) available online: <https://graphcommons.com>.

Kineviz, Inc., "GraphXR User Guide Version 2.2.1," 117 pages, downloaded Jul. 7, 2023, available online: https://static1.squarespace.com/static/5c58b86e8dfc8c2d0d700050/t/5df2bc684c2e38505cf2be1c/1576189042217/GraphXR_User_Guide_v2_2_1.pdf.

Structr GmbH, "Schema," 13 pages, downloaded Jul. 7, 2023, available online: <https://docs.structr.com/docs/schema>.

The Cytoscape Consortium, "Cytoscape user manual," 2 pages (2017).

University of Toronto, "Visualizing a Network Dataset Using Gephi," 45 pages (2021) available online: <https://mdl.library.utoronto.ca/technology/tutorials/visualizing-network-dataset-using-gephi>.

\* cited by examiner

RESEARCH AND INVESTIGATION SYSTEMS INCORPORATING GRAPH DATABASES

BACKGROUND

Graph databases are purpose-built to store and navigate complex, interrelated data. Graphs may be displayed as a pictorial representation of the nodes and edges of the graph. There is significant research and development underway directed towards graph-based applications. One of the known drawbacks of existing applications in this field is that the visual representation of the information in a graph can quickly become too complex. The complexity, without automated tools, can make the visual investigation and comprehension of information from the graph difficult to achieve. This can include information that can be found from indirect connections through many edge traversals. Also, the volume of data that is available for application is so immense that simply using graph databases and supporting applications will not effectively add to the user's human capability to learn about the subject of interest. Applicant has found that developing tools in this space that are in practice useful and advance the field requires significant effort to find the right balance of features, simplicity, data presentation, and convenience, without which the tools are not useful to users in this field.

SUMMARY

This application generally relates to graphical user interface tools. In an embodiment, a computer-implemented system for data visualization that permits users to investigate, understand, and communicate information represented by complex graphs is disclosed. The system includes a graph database configured to store a plurality of graphs, each graph including multiple graph elements including nodes, edges, and related properties. The system also includes a processor and a non-transitory memory that stores programming instructions. The programming instructions are configured to cause the processor to provide a user interface configured to provide an interactive visual workspace for the user in connection with the graph database, wherein the interactive visual workspace is configured to receive user input allowing a user to interactively add a subject graph including one or more nodes and edges from the graph database to the interactive visual workspace whereby the interactive visual workspace allows the user to explore relationships among the nodes displayed in the displayed graph. The interactive visual workspace is configured to provide the user with an opportunity to interact with the interactive visual workspace to make a user selection of a portion of the displayed graph, wherein each user selection defines a segment of the displayed graph to be an individual subgraph of interest, wherein each segment includes one or more nodes and associated edges and properties defining that individual subgraph of interest. The programming instructions are further configured to cause the processor to configure the user interface to allow the user, after selecting multiple individual subgraphs from the subject graph, to define a parameter that controls an interrelationship between the individual subgraphs of interest. The programming instructions are further configured to cause the processor to display a plurality of display regions configured to each display a region dedicated to provide a visual representation of a corresponding single one of the segments.

Implementations of the disclosure may include one or more of the following optional features. In some embodiments, the programming instructions that are configured to cause the processor to provide the user with the opportunity to make the user selection of the portion of the subject graph include programming instructions that are configured to cause the processor to provide the user with the opportunity to graphically select individual nodes of the subject graph that are displayed in the visual workspace. The programming instructions that are configured to cause the processor to display the plurality of display regions may include programming instructions that are configured to cause the processor to automatically display the plurality of display regions in response to the user selection of the portion of the subject graph. The programming instructions may be further configured to cause the processor to, in response to user input, modify the parameter that controls the interrelationship between the individual subgraphs of interest. The programming instructions may be further configured to cause the processor to, in response to user input, apply annotations to one or more of the individual subgraphs of interest. In some examples, the programming instructions that are configured to cause the processor to display the region dedicated to provide the visual representation of the corresponding single one of the segments include programming instructions that are configured to display the annotations.

The programming instructions may be further configured to cause the processor to, in response to user input, rearrange the individual subgraphs of interest. The programming instructions that are configured to cause the processor to display the plurality of display regions may include programming instructions configured to display an interactive graphical representation of a corresponding subgraph of interest. The programming instructions may be further configured to cause the processor to, in response to user input, save the individual subgraphs of interest for publication. In some examples, the programming instructions that are configured to cause the processor to save the individual subgraphs of interest include programming instructions that are configured to cause the processor to save the individual subgraphs of interest in the graph database. In some examples, the programming instructions that are configured to cause the processor to save the individual subgraphs of interest include programming instructions that are configured to cause the processor to save a copy of the edges and properties associated with the individual subgraphs of interest. In some examples, the programming instructions that are configured to cause the processor to save the individual subgraphs of interest for publication include programming instructions that are configured to cause the processor to display the individual subgraphs of interest in a second user interface that allows user interaction with the individual subgraphs of interest, the second user interface being different than the user interface.

The programming instructions that are configured to cause the processor to display the plurality of display regions may include programming instructions that are configured to cause the processor to display a series of panels, each panel configured to provide the visual representation of the corresponding single one of the segments. The programming instructions that are configured to cause the processor to display the series of panels may include programming instructions that are configured to cause the processor to, in response to user input, rearrange the order of panels in the series of panels. In some examples, the programming instructions that are configured to cause the processor to display the series of panels include programming instructions that are configured to cause the processor to, in response to the user selection of the portion of the subject graph automatically add a new panel to the series of panels, the new panel configured to display the user selection of the portion of the subject graph.

In an embodiment, a method of visualization for graph data is disclosed. The method includes providing an interactive visual workspace for a user in connection with a graph database, wherein the interactive visual workspace is configured to receive user input allowing the user to interactively add a graph including one or more nodes and edges from the graph database to the interactive visual workspace whereby the interactive visual workspace allows the user to explore relationships among nodes displayed in the displayed graph, wherein the interactive visual workspace is configured to provide the user with an opportunity to interact with the interactive visual workspace. The method further includes displaying the graph in the interactive visual workspace. The method further includes receiving one or more selections from the user, each selection defining a portion of the displayed graph as an individual subgraph of interest, wherein each subgraph includes one or more nodes and associated edges and properties defining that individual subgraph of interest. The method further includes, for each selection, making a copy of the individual subgraph of interest and receiving input from the user, the input defining a parameter that controls an interrelationship between two or more individual subgraphs of interest. The method further includes displaying each copy of each subgraph of interest in a panel display area including multiple display regions, each display region configured to provide a visual representation of a corresponding copy of each subgraph of interest according to the parameter.

Implementations of the disclosure may include one or more of the following optional features. In some examples, displaying each subgraph of interest in the panel display area includes automatically displaying each subgraph of interest in the panel display area in response to each user selection of an individual subgraph of interest. The method may further include saving each copy of each subgraph of interest in a graph database. The method may further include, in response to user input, applying annotations to one or more of the individual subgraphs of interest. The method may further include, in response to user input, rearranging the individual subgraphs of interest displayed in the panel display area.

BRIEF DESCRIPTION OF THE DRAWINGS

The accompanying drawings, which are incorporated herein and constitute part of this specification, illustrate various of the embodiments discussed in this document, and, together with the general description given above and the detailed description given below, serve to explain the features of the invention. In the drawings.

In the figures, like reference numerals refer to the same figure elements.

DETAILED DESCRIPTION

Figure 1:
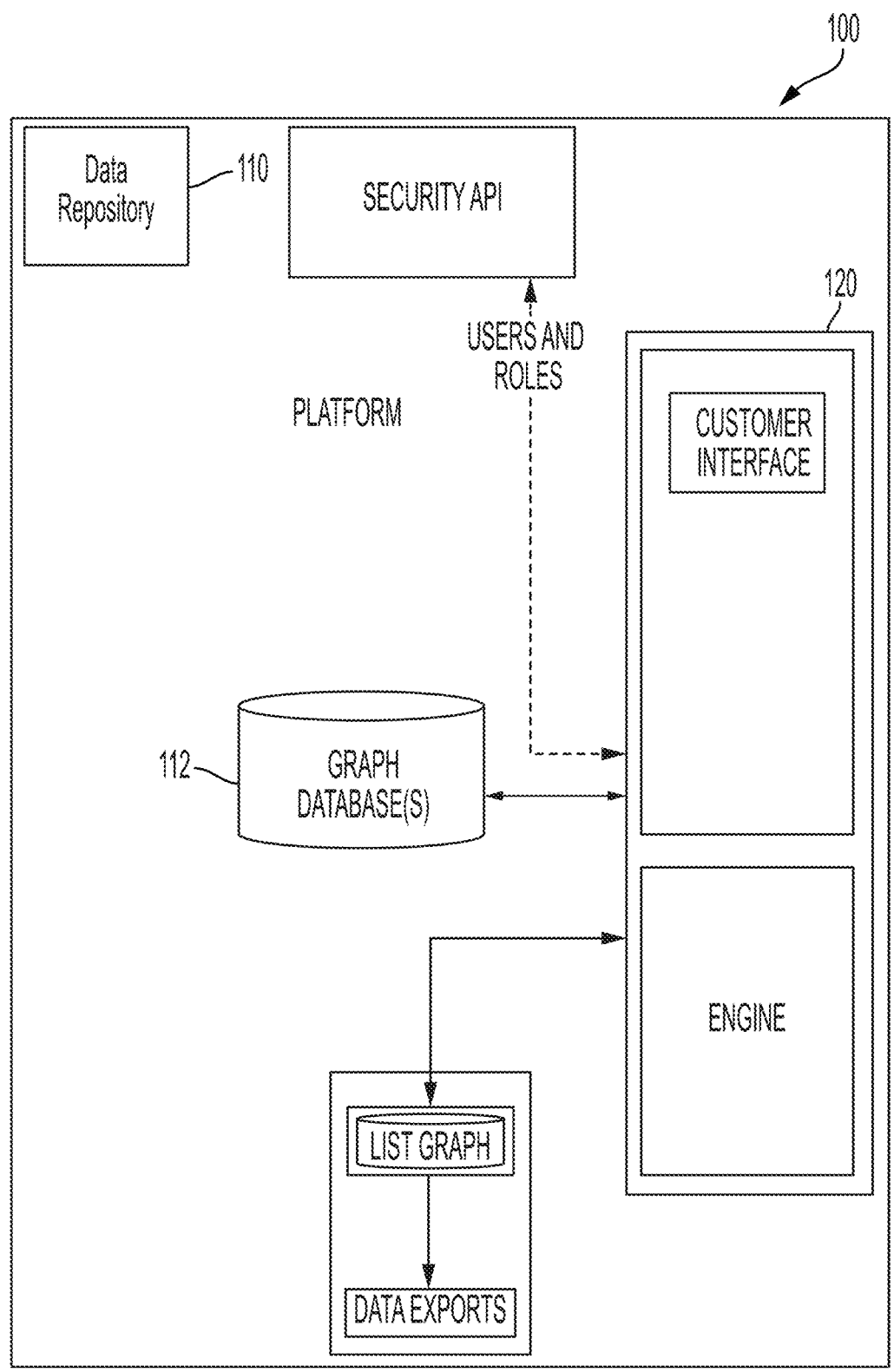
FIG. 1 shows an example graphical user interface system for implementing the various methods and processes described herein.

In the drawings, like numerals indicate like elements throughout. Certain terminology is used herein for convenience only and is not to be taken as a limitation on the claims. The following describes various embodiments of the present invention. However, it should be understood, based on this disclosure, that the claims are not necessarily limited by the embodiments described herein.

Embodiments of the present invention are directed to improvements in the field of interactive electronic investigation systems and in particular to interactive electronic risk investigation platforms. Such systems are actively being developed to provide tools, information, guidance, and resources for users to interact with via a dedicated platform to investigate and comprehend financial, trade, and other business risk and in particular the field is directed to financial crime or sanctions related risk. As can be well understood, the number of entities, activities, resources, rules or regulations, and known relationships (direct or indirect) is massive and complex. In addition, in each particular situation (such as a prospective commercial relationship), the greater the size and detail of the generally available information, the more difficult to effectively discover or understand risk related relationships or activities through known standard methods. Interactive platforms integrating advanced tools such as interactive guided or aided tools can be implemented. However, interactive tools such as filters or guided user experiences and the way the graphical tool interacts with the user are important aspects of the system that can provide benefits and advantages. These can provide a fluid and simple interface while maintaining valuable access to content. It can be key to the user for the interface to provide rapid discovery through the interactive tools (rapid in user action and rapid in user learning and comprehension) without potentially eliminating important information. The development and construction of such interactive and/or integrated systems are important and successful solutions materially add to the growth and success of this field. As mentioned, the platform or system can combine advanced processing such as a software engine with improved user interface tools to advance this field.

At a high level, a software platform can be configured to map entities, relationships, and characteristics of financial, trade, and other business networks such as the commercial, financial, and facilitation networks of sanctioned or other actors that may be associated with risk relevant activity. Through embodiments of the present invention, financial institutions, multinational corporations, legal professionals, and other stakeholders can access visual graphs depicting relationships between relevant actors in order to evaluate their possible exposure to financial, trade, or other business-related risks. For example, such stakeholders can access visual graphs depicting relationships between sanctioned and non-sanctioned actors in order to evaluate their possible exposure to financial crime or sanctions-related risks. Many embodiments illustrated herein are directed to financial crime and sanctions-related solutions and have particular suitability to solving and assisting users with financial crime and sanctions compliance related issues but are also applicable in other ways to investigate financial, trade, and other business risks. It should be understood that the present features or systems can have broader or different applications.

With respect to the application to sanctions, sanctions refers to laws or regulations issued by a government that places commercial restrictions on certain identified entities or entities that are described in more general terms or indirectly (e.g., all subsidiaries of an entity that is specifically identified) and also place restrictions on commercial activities involving the restricted entities. Individuals, companies, or organizations that violate the restrictions are subject to civil or criminal penalties, which can be a significant source of risk, typically arising from being a primary or secondary actor in a financial transaction. In the United States, government organizations involved in issuing and enforcing such regulations include the Department of the Treasury, the Department of State, and the Department of Justice, but others exist in the U.S. and in other countries.

The investigation of actions or relationships involving financial, trade, or other business activity such as sanctions, financial crime, or other similar activity using a software platform for conducting sanctions, financial crimes, and trade compliance is an established niche area and, as mentioned, is a field of development. From an investigation and process perspective, the field can be demanding in the amount of information to evaluate and visualize, the volume of transactions to consider, and the time to carry out the process. New information navigation tools that are supported by automated traversal tools that interact with each other can provide improved features to the field of development.

The tools can, for example, allow the software platform to discover entities (nodes) in the graph through traversal that meet certain traversal rules based on edge type starting from a node of interest and in response, display a graphical element in close association with the discovered node. The graphical element can be interactive and can include information communicating that the node was found in a specialized automated discovery procedure, using traversal rules, and can also display that the node (if applicable) is discovered to meet multiple traversal rules (such as one being 50% owned by one or more sanctioned entity, directly or through intermediaries, and another being a series of vendor relationships that connect a supplier of parts to a retailer of finished goods). The tool can be configured to allow the user to interact with the visual representation of the node to visually see the option (while visually focused on the node) and to select for example the 50% owned option and in response, the software platform displays and adds the subgraph that explains the path(s) that meets the traversal qualification to be displayed in the current visual workspace. This is available at the same time for example as a visual interactive tool to add corridors to the current visual workspace. The software platform may display in the visual workspace interactive panels in which options for adding nodes, edges, or subgraphs can be selected. There are many advantages. For example, the interface in some embodiments allows for an interactive tool to be selectable in an area close to the node which allows a user to quickly conduct an investigation to assess exposure to financial, trade, and other business risk. Another example is that the traversal qualification can be part of a related service that defines the criteria and is configured as a service to send identified nodes (entity names) to customers by way of a list of entities that meet defined criteria. The software tool can be configured to enhance the visual workspace for interactive investigation to be able to include the entities (and the corresponding subgraph) and provide a specialized graphical tool that is for quick and efficient visual investigation using the most relevant parts of the underlying system-wide knowledge. It is possible that user and/or system defined qualifications or criteria are used. Considering the tremendous volume of transactions in this field, enhanced tools that provide quick value to the user in the investigation can be critical to the success of the user and adoption of the platform.

The integration of the "back end" capabilities with interactive graphical user tools can provide a sophisticated interactive guide and advanced navigational tools to users. The combination can for example actively determine and identify, in the visual interface, that the platform previously determined (or can simultaneously or simultaneously in combination with saved graph features) that with respect to a current node under view (selected in the interface) there is a graph pattern (node, edge, and/or combination) that is associated with the node in the platform. If desired, the platform can apply a set of rules based on the current node or current displayed graph and the platform in response, determines the identification and display of further information about associations with the node (or graph).

FIG. 1 depicts an illustrative computer-implemented system 100 for providing a visual interactive software tool that permits users to evaluate financial, trade, and other business risks. The below described implementations are primarily directed to financial crime and sanctions-related risks, but the application to other financial, trade, and business risk is understood. The system 100 comprises a graph database 112 configured to store nodes, edges, and properties, a data repository 110 configured to communicate with different sources over a network to receive financial crime and sanctions-related risk information and save received information access by users and/or automated processes to create nodes, edges, and properties, a production environment configured to interact with customers, including a customer interface 120. It would be evident that this is one implementation and variations are contemplated.

Large sets of complex, interrelated data may be a challenge to analyze and understand, which can hinder making fully informed decisions. In some cases, data items and the relationship between the data items can be displayed in the form of an interconnected graph. Such graphs are used in a wide variety of domains, including analysis of large data sets such as social networks or consumer-product relationships, as well as having applications in biology and computer science. Each data item may be displayed as a node of the graph, and the relationships with other data items may be displayed as edges that connect the nodes. The data is ingested and stored in a graph database, which defines and structures the nodes, edges, and related properties of the nodes and edges in accordance with predetermined data models or data ontology. Examples of tools for visualizing graph databases related to investigating and evaluating financial, trade, and/or business-related risks are disclosed in U.S. application Ser. No. 17/865,046, incorporated herein by reference in its entirety.

The graph databases 112 include an internal graph database and an external graph database. The internal graph database is configured to store nodes, edges, and properties inputted into the system 100 by users and/or automated processes, store nodes, edges, and properties for access and use by users and/or automated processes and store other information entered and produced from the inputted nodes, edges, or properties. The information produced may be information created using the nodes, edges, and properties (e.g., connections and corridors). System 100 may have a process such as an automated process that adds nodes, edges, properties or other data to the external graph (e.g., from the internal graph database). System 100 may be configured for example to include a graph database 112 without an internal graph database (e.g., only an "external graph database") such that system 100 adds or updates the graph database from various sources based on automation (e.g., using a set of configured rules), manual entry, or variations thereof without requiring a preliminary (internal) graph database. The graph database 112 is configured to store nodes and edges for customers' use in the production environment and store visual graphs produced and saved by customers in the production environment.

In some examples, the system 100 includes one or more database servers 110, each of which may host many databases (e.g., graph databases) 112. A user may access the system 100 by an electronic device. The user electronic device may include input devices, such as mouse, keyboard, and so forth. The user electronic device may also include one or more display devices, e.g., for outputting a graphical user interface including an interactive visual workspace, allowing the user to visualize and interact with graph data (e.g., using input devices). In some examples, the user electronic device is configured to access the graph databases 112 either directly or via the database servers 110. In other examples, the user electronic device interfaces with other electronic devices via a communication network. The communication network can be any wired or wireless local area network (LAN) and/or wide area network (WAN), such as an intranet, an extranet, the Internet, or a combination of such networks. In some implementations, the communication network uses the HyperText Transfer Protocol (HTTP) to transport information using the Transmission Control Protocol/Internet Protocol (TCP/IP), such as the Internet. As shown, the user electronic device interfaces with a web server, e.g., as the user interacts with a web browser or other application which provides the interactive visual workspace. The web server may interface with one or more web application servers, which may be configured to execute aspects of the interactive visual workspace, at least one of which is configured to access the graph databases 112.

As users interact with the displayed graph, they may develop insights, better comprehension, find relevant indirect paths, and discover new threads of knowledge such as from nodes connected through a wide, complex, and dispersed node/edge graph. That is, they may find deeper meaning only surfaced due to the features of the interface and the interactive tools made available to users, and combination thereof. Tools and methods disclosed herein provide a technical framework that allows users to navigate graphs and, as the users develop insights, to construct a record of the portions of the graph that led to or support the insights. That is, the interface allows users to take "snapshots" of relevant portions of the graph and to coherently organize the snapshots. The interface may also allow the user to further refine and/or annotate the recorded insights and may save the recorded insights and/or make the recorded insights available for publishing to others.

As disclosed above, complex interrelated data may be stored in one or more databases 112, and the user electronic device provides a graphical user interface including an interactive visual workspace that allows the user to visualize and interact with the graph data. Using the graphical user interface, the user may access one or more graphs, e.g., stored in one or more graph databases 112, for display and interaction. Similarly, the user interface may store graph data in the one or more graph databases 112, e.g., after modification by the user. Also as disclosed above, the interactive visual workspace may be provided within another application, such as web browser or other general-purpose graphical program. Alternatively, the interactive visual workspace may be provided by an application that is primarily configured to (and/or substantially dedicated to) providing such an interface. FIGS. 2, 4-6, and 8 illustrate example displays of such a dedicated application. However, it should be understood that the interactive visual workspace is not limited to dedicated applications.

Figure 2:
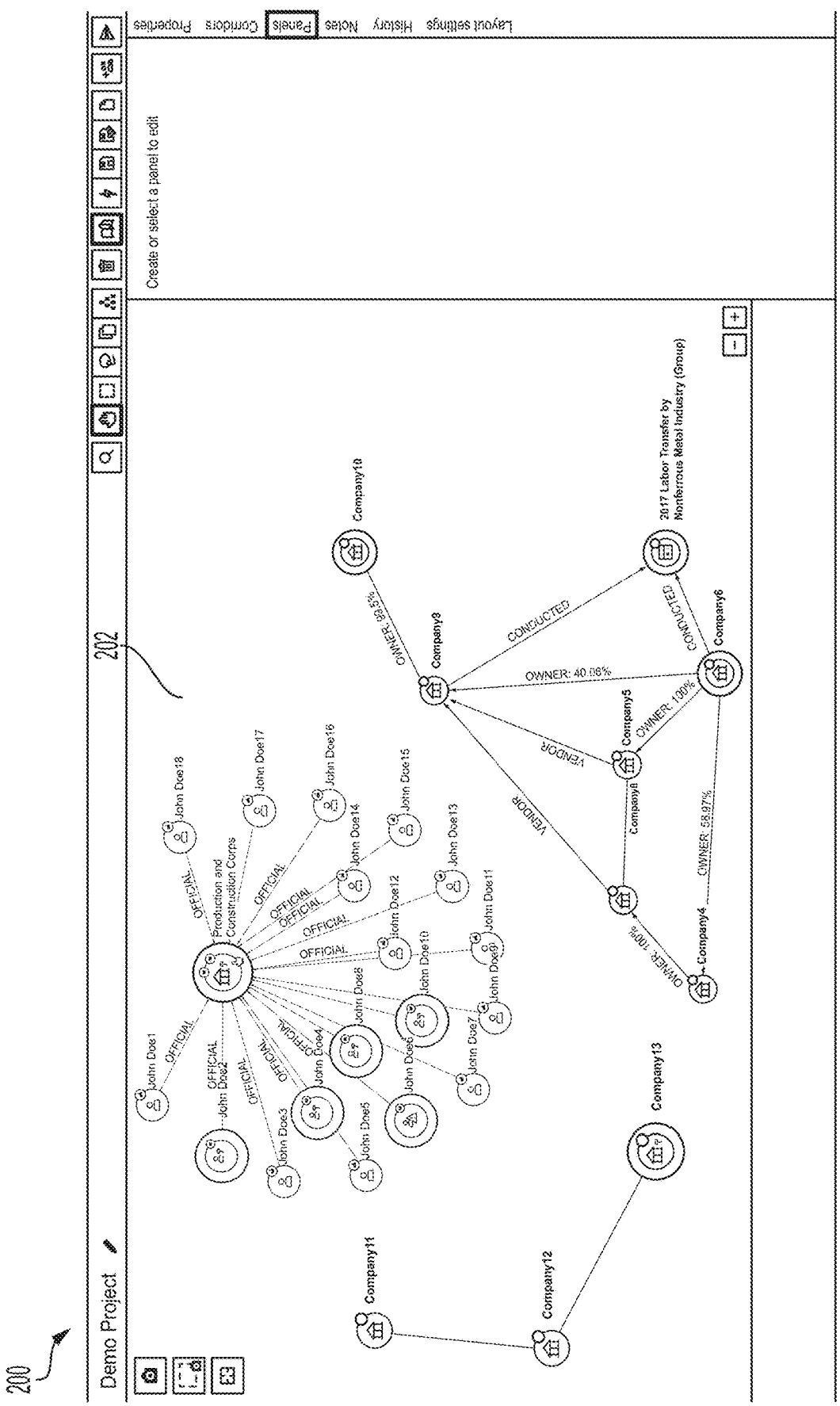
FIG. 2 shows an example display of a graphical user interface, according to embodiments of the present invention.

Referring to FIG. 2, an example visual workspace 200 is shown. As shown, the example visual workspace 200 is displaying at least a portion of the nodes and edges of one graph in an interactive graph display area 202. That is, the visual workspace 200 may allow the user to pan or zoom or otherwise explore the graph in the visual workspace 200 within the graph display area 202, displaying as much or as little of the graph as specified or indicated by the user. Each displayed node or edge is labeled to indicate the data item associated with each node and/or the type of relationship between nodes that are connected to other nodes by edges. In some examples, the visual workspace 200 does not automatically label displayed nodes and/or edges but may provide such labels in response to user input, such as a menu option or selection of one or more displayed items. The workspace 200 may display additional information in the graph display area 202, including properties associated with nodes or edges, e.g., either automatically or in response to user input. User input may include a menu selection or mouse/pointer selection of (or hovering over) the node/edge. In other examples, the visual workspace 200 may display two or more graphs simultaneously, allowing the user to explore multiple graphs within the graph display area 202. The two or more graphs may be displayed in the same interactive graph display area 202, or in adjacent interactive graph display areas 202.

In addition to allowing users to explore one or more graphs, the workspace 200 may also be configured to allow users to modify graphs and/or create new graphs and allow the user to save the created or modified graph(s), e.g., in the graph database 112. For example, the workspace 200 may provide a menu selection or other means for the user to create a new graph. The workspace 200 may also provide for the user to add, delete, and/or modify nodes or edges displayed within the graph display area 202, including inputting new data or modifying existing data items. For example, the workspace 200 may provide for users to add new nodes, add data to the newly added nodes, and/or create connections (edges) between newly added nodes and existing nodes. The workspace 200 may also provide for the user to add, delete, and/or modify properties associated with the nodes or edges, or add, delete, and/or modify any information associated with the graph. After the graph has been created or modified, the workspace 200 may provide a menu selection or other means for the user to signal the workspace 200 to save the graph, e.g., in one or more graph databases 112.

Figure 3:
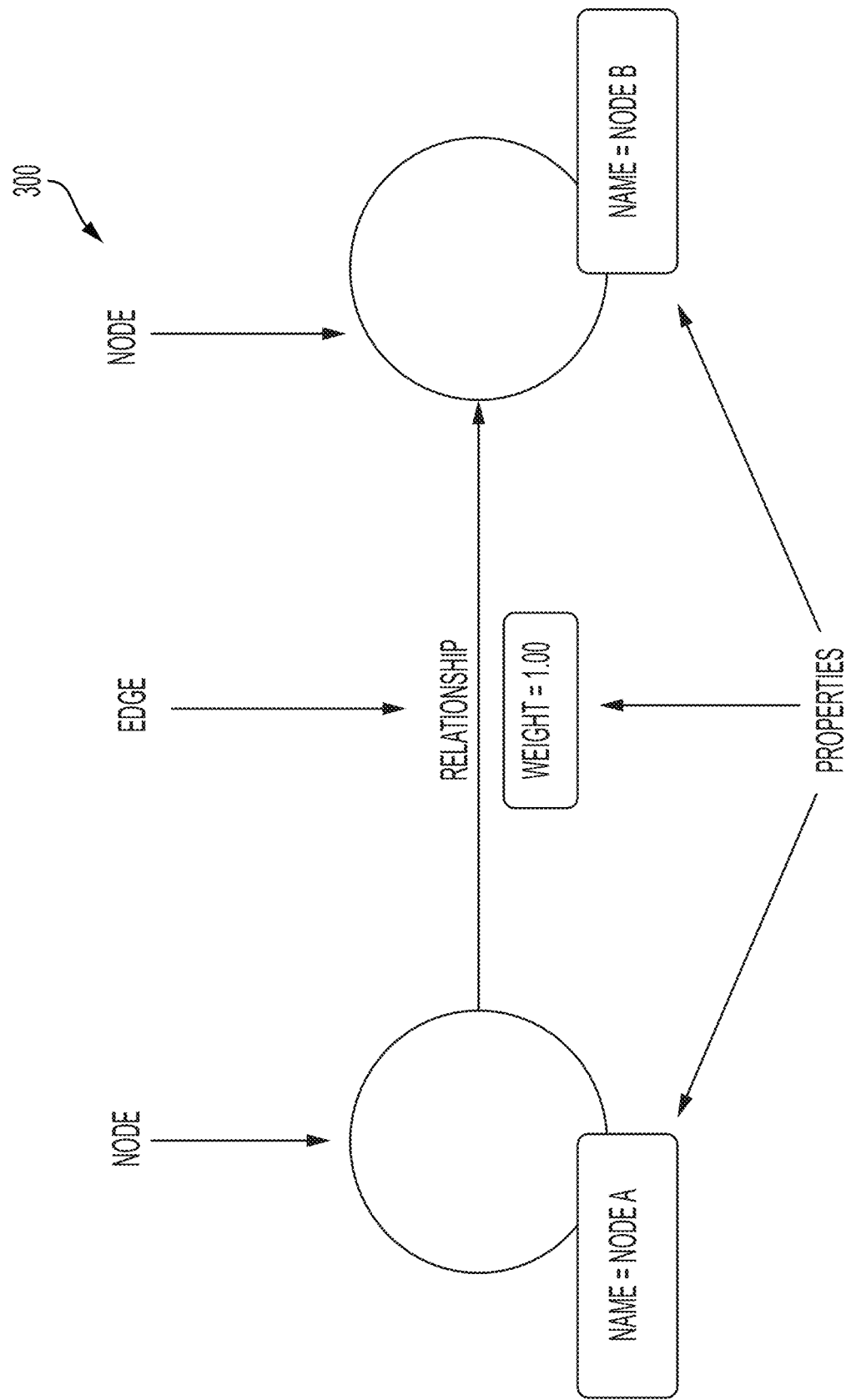
FIG. 3 depicts elements of a graph database.

In an example system, a node may represent a subject. The system may be configured to allow for the subject to be an individual, entity, postal address, e-mail address, event, number, telephone number, campaign, or other subject. The subject may be one that appears on, e.g., a sanctions list or one that has a criminal record (sanctioned subject), one that is materially associated with a sanctioned subject but does not appear on a sanctions list (associated subject), or one that is neutrally associated with a sanctioned subject or an associated subject and does not appear on a sanctions list (neutral subject). A node is described by properties that include one or more words, numbers, symbols, or a combination thereof by which the underlying subject is known or referred to. When the subject (or property) is a number, the number may be a phone number, fax number, driver license number, social security number, passport number, bank account number (including credit card and debit card account numbers), identification number used by the system, or other number. In this example, an edge represents a relationship between two nodes. The relationship may be a business relationship (e.g., creditor, supplier, joint-venture, etc.), an ownership relationship (e.g., majority shareholder, minority shareholder, subsidiary, etc.), a position relationship (e.g., director, manager, owner, etc.), a banking relationship (e.g., account holder, mortgagor, etc.), a familial relationship (e.g., father, daughter, cousin, etc.), and other relationships. An edge is described by properties that include one or more words, numbers, symbols, or a combination thereof by which the underlying subject is known or referred to. FIG. 3 depicts an illustrative node, property, and edge and their respective roles. FIG. 3 depicts a graphical structure 300 of the node, property, and edge, e.g., as presented to a user when he or she assembles them through the workspace in the internal or external production environment. The graph database 112 stores nodes, edges, and information in nonvolatile memory. Nodes and edges are part of a graph database 112 and can also have a graphical representation as part of a user interface.

Figure 4:
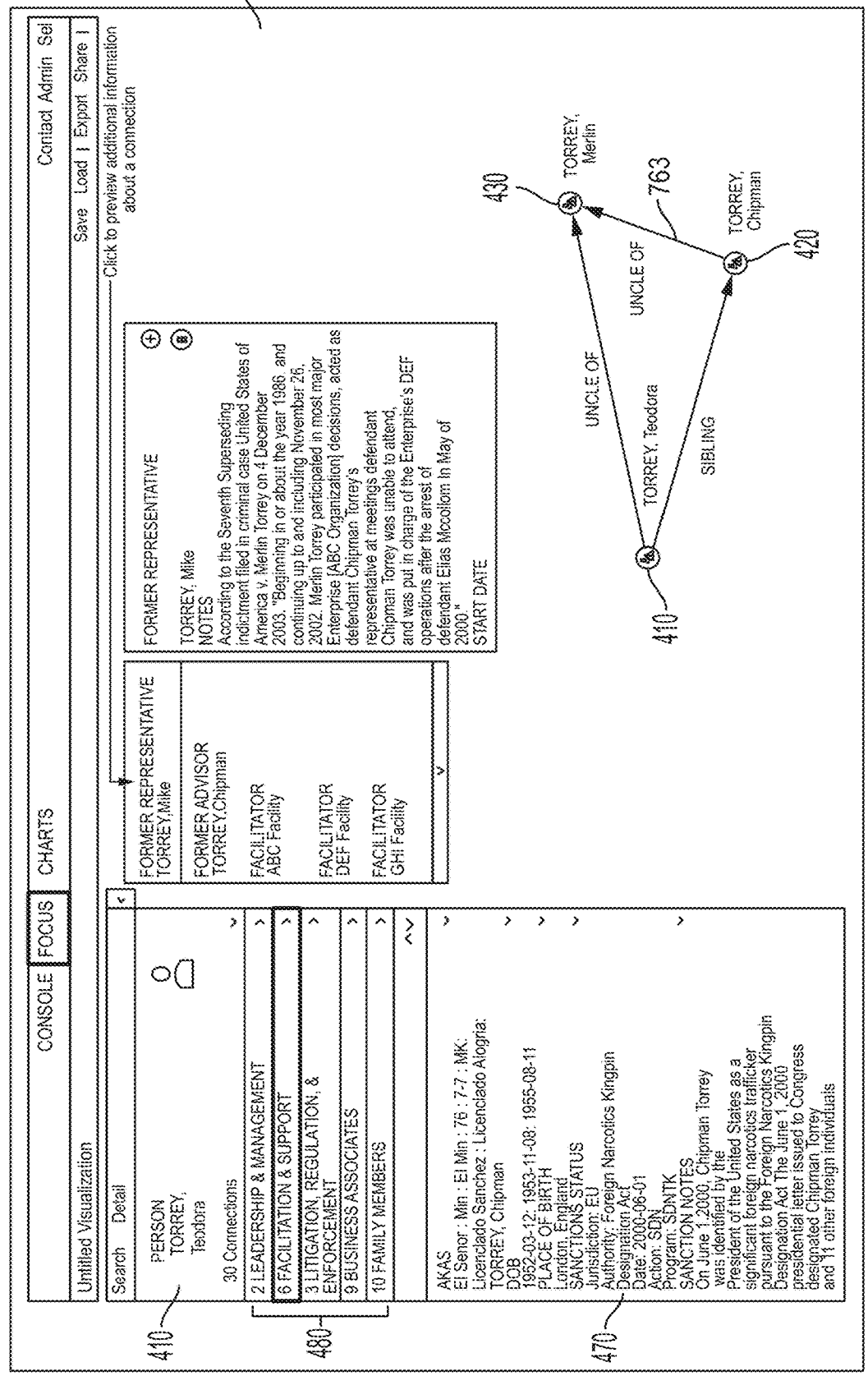
FIG. 4 shows another example display of the graphical user interface, according to embodiments of the present invention.

FIG. 4 depicts a graph after the user interacted with the interface to add nodes 420, 430 to a node 410 in the workspace 200. The customer may view connection information 480 of the node 410 by selecting the node 410 on the workspace 200. In this example, the subject of the node 410 is a person. The connection information 480 includes nodes connected to the node 410, and the visual interactive interface 405 also displays the connected nodes 480 in categories. A connected node is a node that has an edge connection to the displayed node. The categories are based on the relationship of the connected nodes to the node 410 (displayed node that is clicked on/selected by the user resulting on the system retrieving relationship information, instantly). The categories for relevant nodes connected to a displayed node (e.g., node 410) may include a leadership & management category, a facilitation & support category, a litigation, regulation enforcement category, a business associates category, and a family members category. The interface 405 displays the number of relevant nodes in each category and the total number of relevant nodes of all the categories. The total number of relevant nodes of all the categories is also the total number of connections the node 410 has. The interface 405 also displays the additional information 470 about the added node 410 in conjunction with the connection information 480.

The interface includes the ability to search for entities and add a search result to the workspace. The visual interactive interface 405 includes a first command configured to allow the user to enter keyword searches in the search window of the interface. The user can conduct keyword searches for a node by typing letters, numbers, symbols, marks, or a combination thereof in the first command and the interface 405 can display the search results in categories (similar to information as shown in FIG. 4). The categories include an entity category, a person category, an address category, or other categories. Each category includes nodes of the corresponding category that match the keyword search. The search results include nodes that are similar or match the keyword search node. The interface 405 displays the number of results (or nodes) in each category and the total number of results (or nodes) of all the categories. The results delivered in response to the keyword search can include any type of node. A user may select a category to view all the results in that category from the interface 405. The user can select the person category and the interface 405 displays the nodes in that category in a window. The interface 405 includes buttons, tabs, windows, screens, and other mechanisms to receive customer selection and to display search results. The interface 405 also includes electronic workspace 200 to which nodes can be added and displayed via visual graphical elements. The interface 405 is software that is implemented and running on a computer using computer instructions that are stored in memory that, when executed by a processor, displays or provides the graphical and user-interactive features described herein (wherein the user can interact with the interface using an input device of the computer such as a keyboard). This includes the situation where the interface 405 is provided through a web browser.

From the search results, the user may select a node to view additional information about the node. Additional information helps the user decide if the selected node matches the keyword search or the node the customer intends to evaluate for potential exposure to financial, trade, or other business-related risks. The nodes in each category have their corresponding additional information. For example, additional information of the person category may include a total number of connections, the name, aliases, date and place of birth, nationality, resident country, sanctions status of the person, and other information. Sanctions status information may include the jurisdiction (e.g., country or state) that sanctioned the person or entity represented by the node, the date the person was sanctioned, and other information. Additional information is displayed in another window configured with one or more commands to add the node to the electronic workspace 200. The command may allow the customer to add and place a node on the workspace 200 immediately upon clicking the command. The location of the node can be determined by the software. The location can be subsequently changed by the user if desired. The command may allow the customer to drag a node onto the workspace 200. Upon clicking and holding the mouse on the command, the selected node may be affixed to the mouse cursor and be moved along with the mouse cursor. The location of the node is determined by the user and the user can move the node to a location he or she desires. The node can be placed at the desired location upon releasing the mouse at the desired location. The node that appears on the workspace 200 is the visual graphical element of the node generated by the software. The visual graphical element of the node is sometimes referred to as a node in the description for ease of reading the instant application. Adding a node to the electronic workspace 200 (visual workspace) may also be referred to as adding a node to the workspace. In addition to the graph display area 202, the example visual workspace 200 may include additional interactive display areas. For example, the visual workspace 200 may include a panel display area 504, where the visual workspace 200 may display selected segments of a displayed graph, as will be discussed in more detail with respect to FIGS. 5-6 and 8. The workspace 200 may also include additional display areas, such as a panel editing area 506 for editing and/or annotating selected segments.

Figure 5:
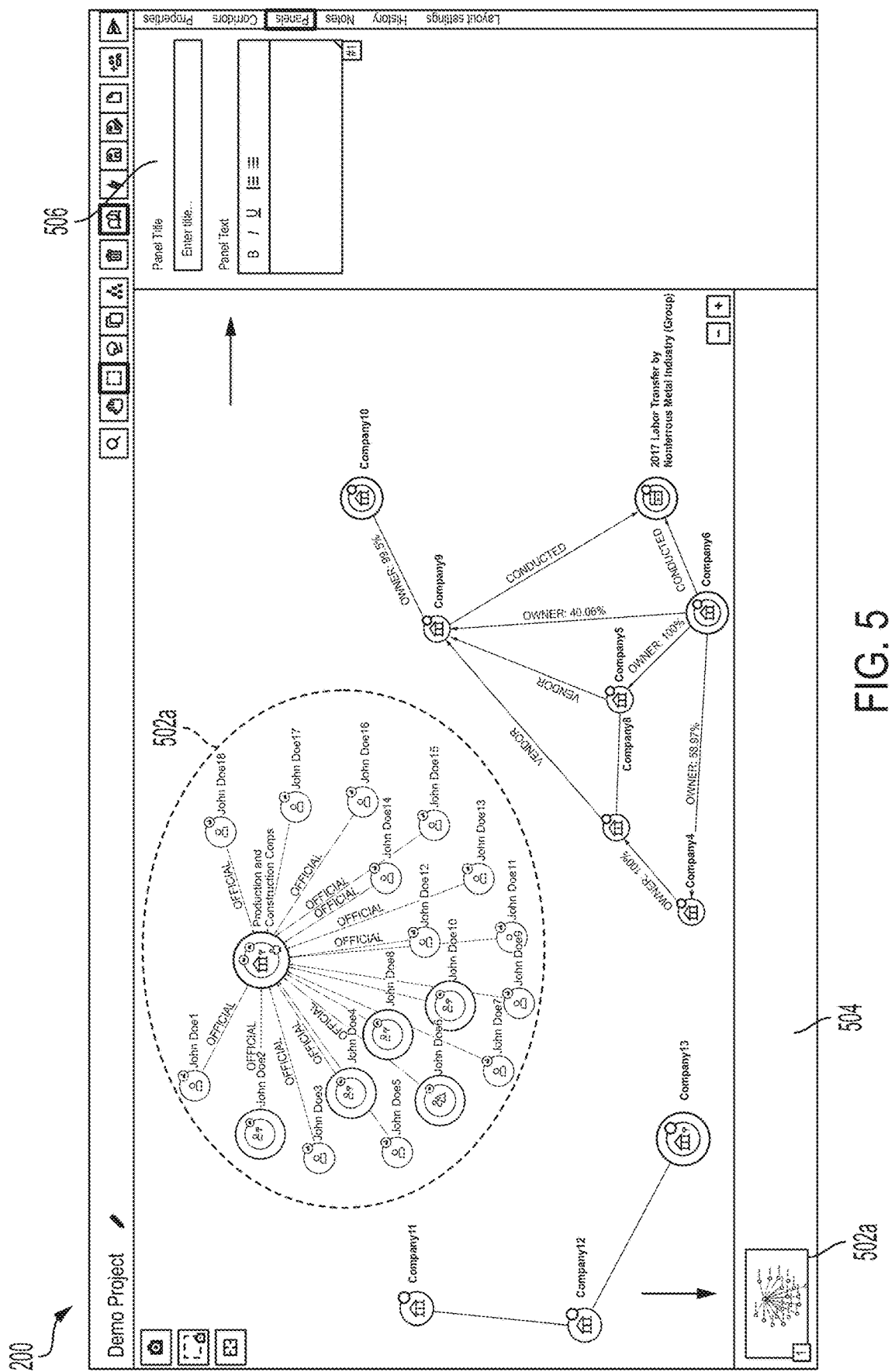
FIG. 5 shows another example display of the graphical user interface, according to embodiments of the present invention.

Referring to FIG. 5, the example visual workspace 200 may provide for users to select or identify subgraphs 502, i.e., particular segments or portions of a displayed graph that are of interest. The subgraph 502 consists of a selected subset of the nodes of the graph and includes the edges that interconnect nodes of the selected subset. In some implementations, the workspace 200 provides for the user to identify the subset of nodes by selecting nodes of interest from the nodes that are displayed in the graph display area 202. That is, the user may select individual nodes by positioning a cursor over (or near) a node and selecting the node using mouse, keyboard, touchscreen, gesture, or other interaction. Alternatively or additionally, the user may define a perimeter, such as a bounding box, circumscribing particular nodes to identify the subgraph 502 of interest. In some implementations, the user identifies nodes of interest based on data contained within the graph. For example, the user may identify nodes of interest based on one or more data items associated with the node or based on one or more edges associated with the node. In some implementations, the workspace 200 provides for users to input queries that, when applied to graph data, identify a subset of nodes. The query may be processed by the user electronic device, the database server 110, the web application servers 140, or other suitable query processing device having access to the graph data.

For example, graph database 112 may include graphs of business entities and officers or other principals associated with the business entities. The user may submit a query, e.g., through the workspace 200, for all business entities associated with a particular person (or, conversely, all people associated with a particular business entity). In another example, the user may query the graph data for all business entities that are connected within a threshold number of edges to a particular other business entity, i.e., all graph nodes within a threshold proximity to the particular graph node. In any of these examples, the workspace 200 may display the subset of nodes that match the query as a subgraph 502. In some examples, after selection, the workspace 200 only displays the selected subgraph 502. In other examples, e.g., as shown in FIG. 5, the workspace 200 displays the nodes of the selected subgraph 502 differently than other (non-selected) portions of the graph. As shown in FIG. 5, the non-selected nodes may be greyed-out or otherwise deemphasized in the display compared to the nodes of the selected subgraph. Alternatively, the workspace 200 may highlight or otherwise emphasize the selected nodes, or draw a perimeter around the selected nodes. In this or other similar ways, the workspace 200 clearly indicates to the user which nodes are included in the subgraph and which subgraph of several subgraphs is the current focus of the interaction. The graph database comprising nodes, edges, and other properties is preferably configured to have directional node-edge-node relationship such as when one entity is a parent company of another entity. For example, there would be a single edge directed from the parent node to the subsidiary node.

Figure 8:
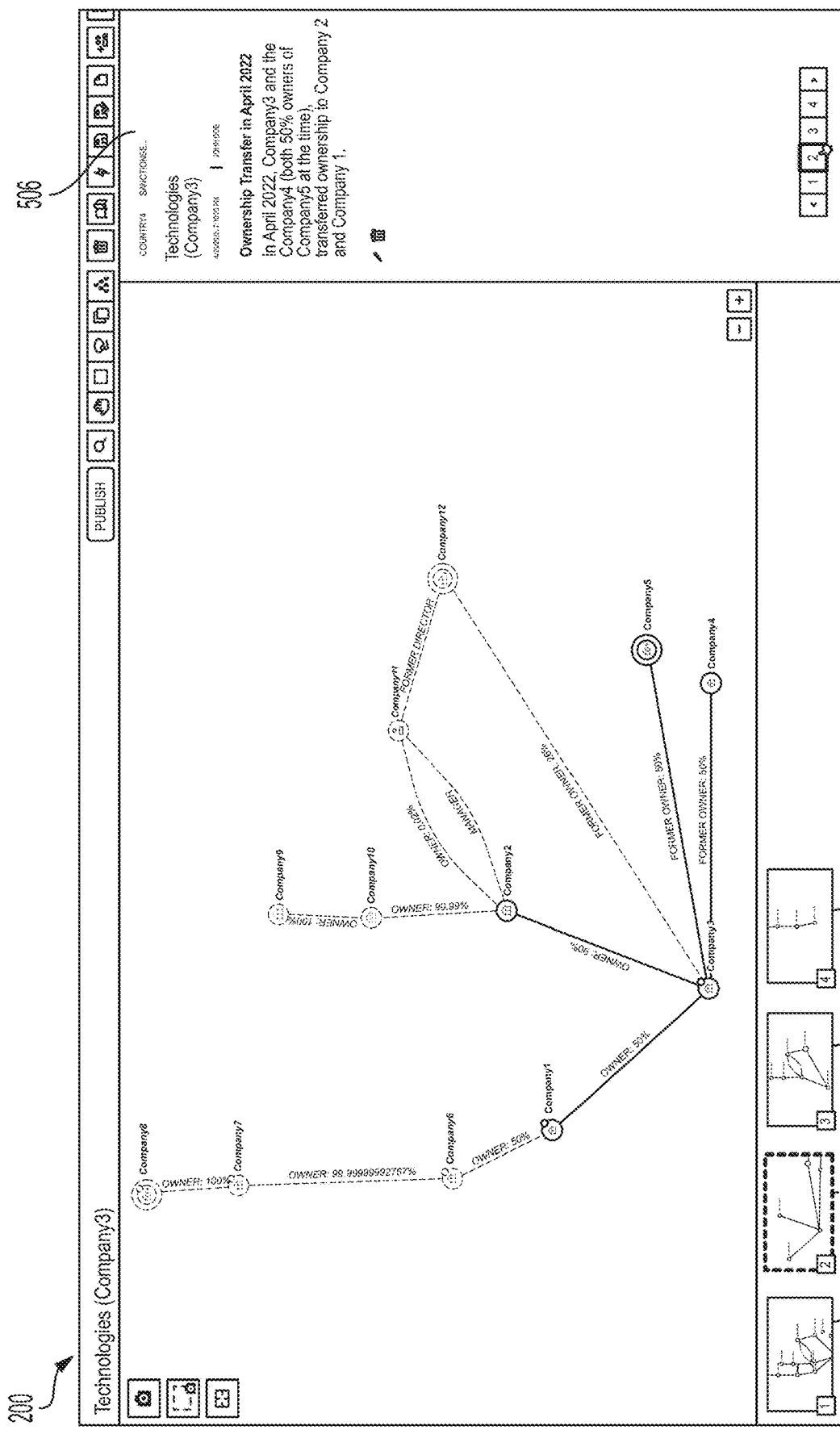
FIG. 8 shows another example display of the graphical user interface, according to embodiments of the present invention.

In some examples, when a user selects or identifies a subgraph 502 of interest, the workspace 200 automatically makes a copy of the subgraph 502. That is, once the user selects nodes of interest, the workspace 200 makes a copy of the selected nodes, edges, and/or properties associated with the selected nodes. In some implementations, the workspace 200 automatically saves the copy, e.g., in the graph database 112, or provides the user the option of saving the copy of the subgraph. The system may be configured to store the selected subgraphs in a memory buffer or temporary storage that the system uses for the live interaction with the subgraph or group of subgraphs selected from the current subject graph. This optional approach allows the user to work with the subgraphs and decide whether to save the work to non-transient memory for future retrieval (in the workspace). As disclosed above, the workspace 200 may include a panel display area 504, where the visual workspace 200 may display selected segments of a displayed graph. As shown in FIG. 8, the panel display area 504 provides for displaying multiple subgraphs (e.g., 502e-h) in the panel display area 504. That is, the panel display area 504 is divided into multiple subregions, each of which provides a visual representation of a corresponding select subregion of interest. As shown, the panel display area 504 includes multiple, horizontally separated subregions extending between the left-hand side and right-hand sides of the panel display area 504. One of ordinary skill in the art would understand that the panel display area 504 could be organized vertically, rather than horizontally, or could be configured as a two-dimensional grid or other arrangement. In some implementations, when the user selects or identifies a subgraph 502 of interest in the graph display area 202, the workspace 200 automatically displays the selected subgraph 502 (or the copy of the selected subgraph 502) in the panel display area 504. As shown in FIG. 5, the selected subgraph 502a is automatically displayed in a first available horizontal "slot" within the panel display area 504, i.e., the leftmost unused subregion of the panel display area 504. In some implementations, each time the user selects a new subgraph 502, the newly selected subgraph 502 is (automatically) added to the next available subregion of the panel display area 504.

As disclosed above, the workspace 200 may provide a panel editing area 506 for editing and/or annotating selected segments. As shown in the example visual workspace 200 of FIG. 5, the panel editing area 506 is on one side of the graph display area 202. In other implementations, the panel editing area 506 may replace the graph display area 202 or may be displayed in a separate window, such as a pop-up window or dialog that is only visible to the user when a particular subgraph has been selected from among the subgraphs (e.g., 502a-d, 502e-h) displayed in the panel display area 504. Other arrangements are also possible. As shown in FIG. 5, the panel editing area 506 is configured to allow the user to provide a name or title to associate with each selected subgraph 502. In some implementations, the workspace 200 displays the name or title near the associated subgraph 502 in the panel display area 504. The panel editing area 506 may also be configured to allow the user to annotate each selected subgraph 502, e.g., to provide narrative context as to why the subgraph 502 was selected and/or what insight the user gleaned from the subgraph 502. In some implementations, the annotation is also displayed in the panel display area 504. In other implementations, the annotation is displayed in a pop-up window, e.g., in response to a user input, such as selecting the associated subgraph 502 in the panel display area 504 or by hovering the cursor over the associated subgraph 502.

In some implementations, the panel display area 504 is configured to allow the user to define one or more relationships between individual selected subgraphs 502 in the panel display area 504. In some examples, the relationship is the sequence or order of the individual selected subgraphs 502. For example, the panel display area 504 may provide for the user to rearrange the position of the subgraphs 502 in the panel display area 504, e.g., by dragging and dropping, or other suitable means. In this way, the user may, e.g., arrange for certain subgraphs 502 to be immediately adjacent. Alternatively or additionally, the panel display area 504 may provide for the user to annotate relationships between subgraphs 502, such as immediately adjacent subgraphs 502. In this way, the user may, e.g., arrange a logical sequence of subgraphs 502, annotating the logical relationship between predecessor and successor subgraphs 502. In this way and others, users may document an insight the user gained while exploring the graph. For example, the user may relate, in story form, information in particular subgraphs 502 that, alone or combined with annotated relationships, document or explain the insight. The workspace 200 may provide for the user to save the (annotated) series of subgraphs 502 and/or the interrelationships between the individual subgraphs 502 for later viewing by the user, or for publication to others. For example, the workspace 200 may save the series of subgraphs 502 in the graph database 112. In some implementations, the workspace 200 may save the series of subgraphs 502 in a format that allows others to interact with and/or explore the subgraphs 502. Alternatively, the workspace 200 may save, export, and/or publish the series of subgraphs 502, e.g., in a presentation format, such as a PDF, slide deck presentation, or HTML to allow others to easily view (or embed in a web page) the series of subgraphs 502, albeit with limited interaction. Individual (and/or selected groups of) subgraphs 502 may be exported as spreadsheets, documents, or other forms of output.

In one embodiment, each displayed subgraph 502 is not merely a thumbnail image of the saved segment. Instead, the workspace 200 displays each subgraph 502 (in the panel display area 504) in a similar fashion to how the workspace 200 displays graphs in the graph display area 502. That is, the panel display area 504 presents a representation of the copy of each subgraph 502, including changes as they occur to the graph in the primary window (e.g., in real time). As disclosed above in the embodiment, each subgraph 502 is a copy of a segment of the original graph. In some embodiments, once copied, the state and content of the copied subgraph corresponding to a panel are independent of any subsequent changes made to the source of the copied subgraph. For example, in such embodiments, the system is configured to allow the user to remove nodes from the displayed graph in the primary window and in response, does not change the displayed view of the panel in panel area 504. In other embodiments, subgraphs 502 may maintain links or references to at least some portion of the original graph, so that at least some or all changes to the original graph are also represented (mirrored) in the subgraph 502.

Figure 6:
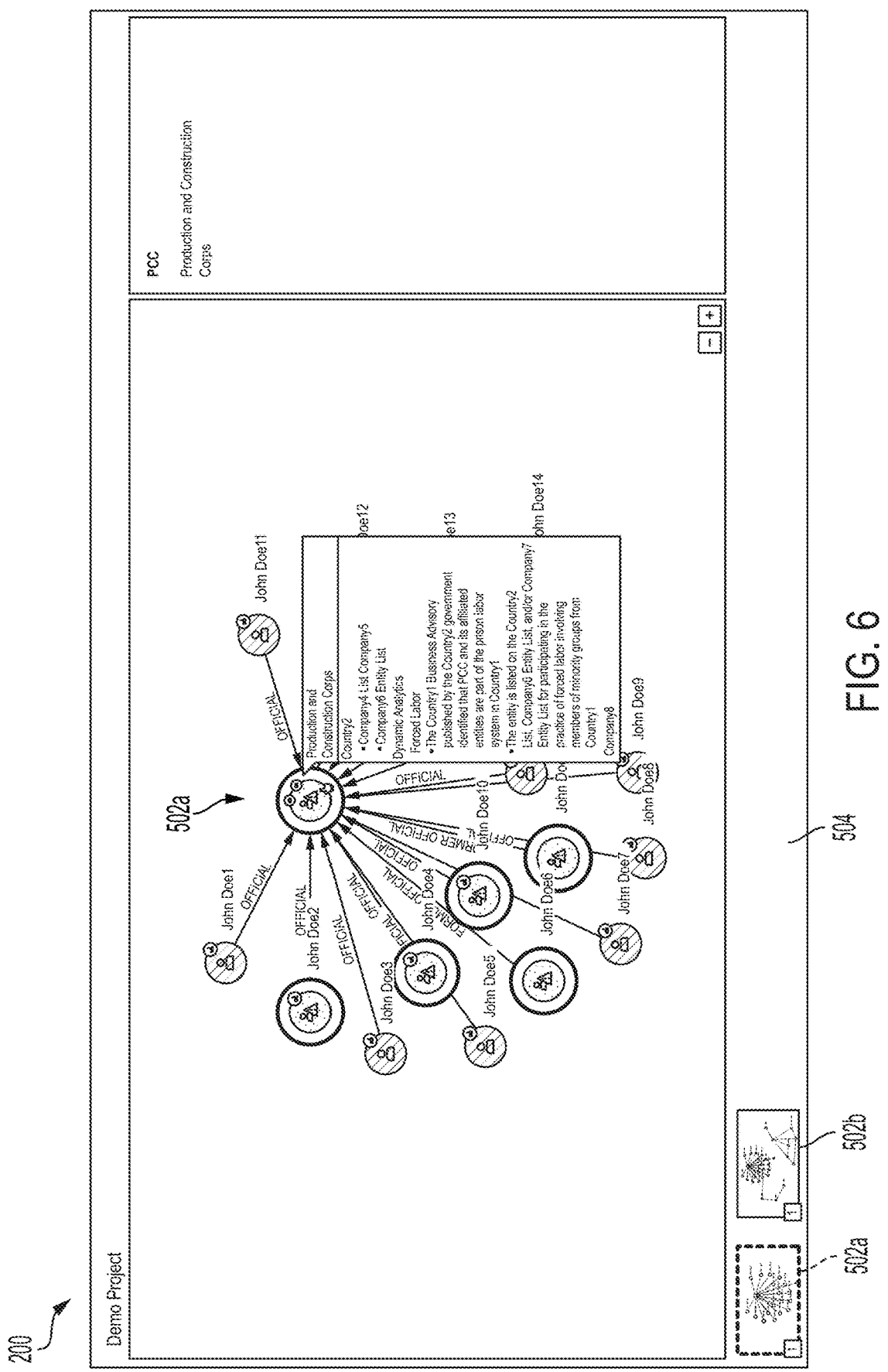
FIG. 6 shows another example display of the graphical user interface, according to embodiments of the present invention.

Referring to FIG. 6, two subgraphs 502a-b are displayed in the panel display area 504. As shown, each subgraph 502 is a copy of a segment of the original graph. That is, in the embodiment depicted in FIG. 6, changes to the original graph do not affect the subgraph 502. Instead, the workspace 200 provides for the user to pan or zoom or otherwise explore the subgraph 502 within the graph display area 202, displaying as much or as little of the graph as specified or indicated by the user, in an analogous fashion to how the workspace 200 provides for the user to interact with the original graph. In other implementations, the workspace 200 provides for the user to explore and/or otherwise interact with subgraphs in a separate display area, such as a popup window. By displaying the subgraph interaction area separate from the graph display area 202, the workspace 200 provides for the user to simultaneously interact with the subgraph and with the original graph. As shown, the user has selected the first subgraph 502a (i.e., the leftmost subgraph 502 in the panel display area 504). In response, the workspace displays the selected subgraph 502a in the graph display area 202. By doing so, the user is able to update the subgraph 502a, e.g., adding or deleting nodes or connections or otherwise fine-tune the subgraph 502a for the user's purpose. For instance, the user may delete nodes that the user believes are less relevant to the insight that the user wishes to convey. After the user has finished working with the subgraph 502a, the user may resume interaction with the original graph in the graph display area 202. As disclosed above, in one embodiment, changes to the subgraph are depicted in the panel display area 504 as they occur in the graph display area 202. Although FIG. 6 shows the subgraph 502a in the graph display area 202, in other implementations, the workspace 200 may provide an edit pop-up window or dialog for exploring and/or modifying the subgraph 502a.

As disclosed above, the workspace 200 may provide for the user to save the (annotated) series of subgraphs 502 for publication, e.g., to others. In some examples, the workspace 200 saves the series of subgraphs 502 in a single file, e.g., in the graph database, to facilitate transmitting the series of subgraphs 502 to others. The transmitted series of subgraphs 502 may be viewed by others using a dedicated viewing application, in the workspace 200 disclosed above, or a viewing application provided within a web browser, among other options. Referring to FIG. 8, the workspace 200 may provide for playing back a saved series of subgraphs 502 by the user or by others, e.g., by opening such a saved file. As shown, the series of subgraphs 502e-h comprises four subgraphs 502 as displayed in the panel display area 504. As shown, the second subgraph 502f in the series is selected. The workspace 200 displays the selected subgraph 502f in the graph display area 202, allowing the user (or others) to explore the selected subgraph 502f. As shown, the workspace 200 optionally displays the original graph, but greying out or otherwise deemphasizing portions of the original graph that are not also in the displayed subgraph 502f. Also as shown, the workspace 200 displays annotations associated with each displayed subgraph 502, e.g., in a panel editing area 506. In this way, the user or other can quickly and easily navigate between each subgraph 502 in the series, understand the context of the subgraph 502 within the larger original graph, and access the user-supplied annotation associated with each subgraph 502. In some examples, the workspace 200 provides for additional editing of the series of subgraphs 502 and provides for saving and/or republishing the edited series of subgraphs 502.

Figure 7:
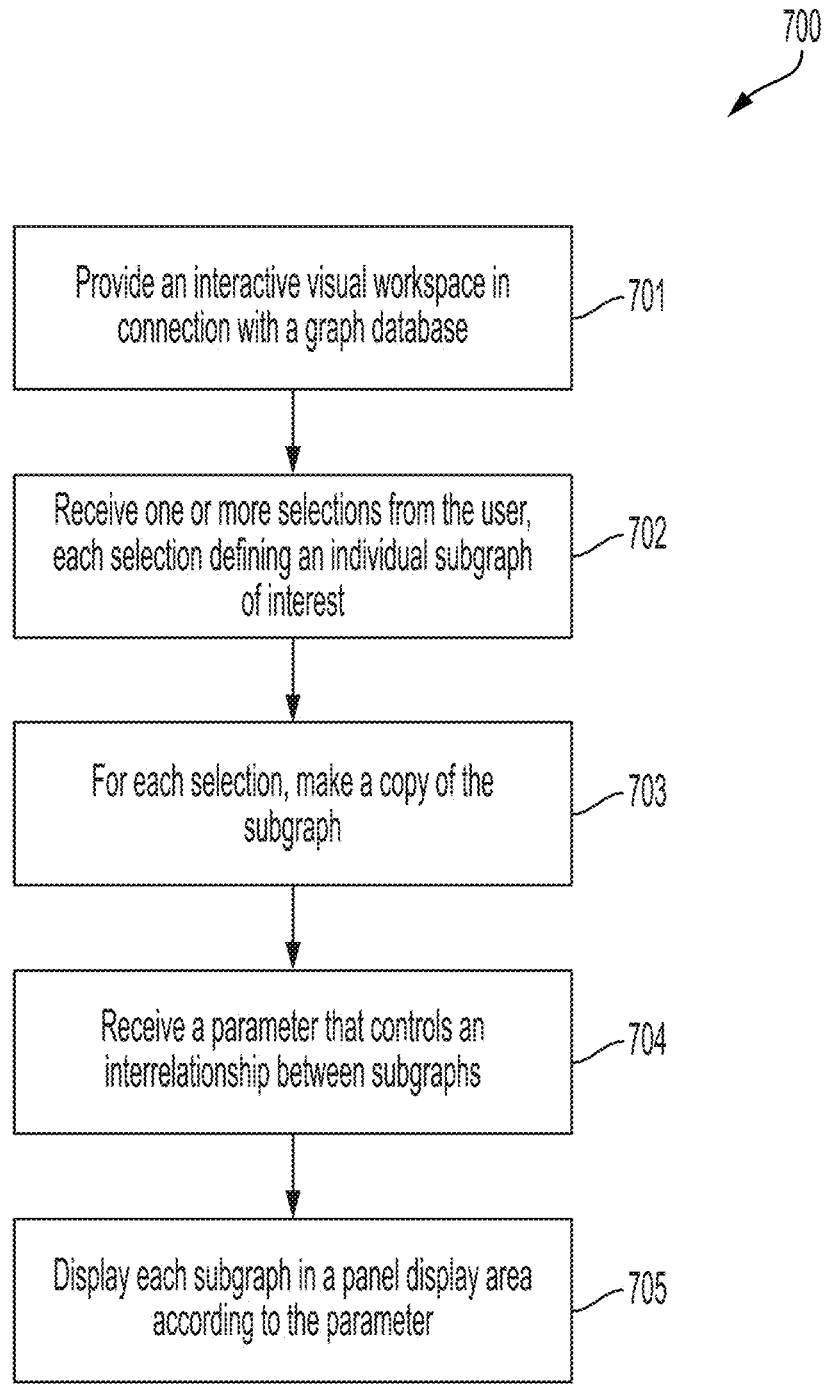
FIG. 7 shows a flowchart of an example method, according to embodiments of the present invention.

FIG. 7 shows a flowchart 700 of an example method, according to embodiments of the present invention. At step 701, the method includes providing an interactive visual workspace 200 in connection with a graph database 112. In some examples, the graph database 112 is configured to store a plurality of graphs, each graph comprising a plurality of graph elements comprising nodes, edges, and related properties. The interactive visual workspace 200 may be configured to receive user input allowing the user to interactively add, e.g., a subject graph, including one or more nodes and edges from the graph database, to the interactive visual workspace. The interactive visual workspace 200 may allow the user to explore relationships among the nodes displayed in the subject graph. The interactive visual workspace 200 may be configured to provide the user with an opportunity to interact with the interactive visual workspace 200, e.g., to make user selections such as graphically selecting particular nodes. For example, at step 702, the method includes receiving one or more selections from the user, each selection defining an individual subgraph of interest. Each user selection may define a segment of the displayed graph to be the individual subgraph of interest, wherein each segment may include one or more nodes and associated edges and properties defining that individual subgraph of interest. At step 703, the method includes, for each selection, making a copy of the subgraph. In some examples, the method also includes automatically displaying the subgraph of interest, e.g., in a panel display area 504. At step 704, the method includes receiving a parameter that controls an interrelationship between subgraphs. At step 705, the method includes displaying each subgraph in the panel display area 504 according to the parameter. In some examples, the method further includes allowing further user input and, in response, modifying the parameter that controls the interrelationship between the individual subgraphs of interest. Other examples include allowing the user to apply annotations to a subgraph of interest, allowing the user to rearrange the individual subgraphs of interest within the panel display area 504 (such as by using a mouse to rearrange the order of panels in display area 504), and/or allowing the user to save the individual subgraphs of interest for publication and/or export.

In some embodiments, the system is configured to maintain a temporary buffer stored on the system (with the buffer being implemented in the local user computer and the cloud server for the application to provide synchronization). The temporary buffer stores the node and edges (subgraphs) that a user has selectively added to an interactive visual workspace. Data representing the selected and arranged nodes and edges (current graph) are saved as a temporary database or file (in the buffer) corresponding to the current active visual workspace, and the database/file is stored and maintained in the temporary buffer (e.g., as mentioned having local and remote instances for synchronization and presentation speed). When the panel feature is activated, the system is configured to create a temporary designated folder and/or file (e.g., "scratch" storage) for the work in the panel mode. The system is configured to create and maintain temporary storage that contains the data representing a selected panel from the current workspace, including graph data. The system may be configured to copy a corresponding portion of the temporary file for the graph in the current workspace (before panel was activated) into a corresponding panel file in the panel feature file and/or folder. The system is configured to maintain the temporary storage for the current workspace when the user is in the panel feature so that the user can return to the workspace in the configuration/arrangement it was in when the panel feature was selected. The system is configured to maintain the panels in one or more temporary files in the buffer when the user switches to working in the interactive workspace of the current graph and be able to return to the panels in the form/shape that the user left nodes or edges of subgraph (such as visual positions or new information added to the panel). In some embodiments, once a panel temporary file is created in the temporary buffer subsequent changes to the subgraph by the user in the panel mode are not synchronized to also change the source temporary file for the current graph. In some embodiments, the system is configured to maintain the state of the temporary storage for the current graph independent from the state of a panel once a panel temporary storage is created. The system is configured to maintain temporary storage for each created panel and related properties (such as the specified sequence for the panels). These related properties can be used to self-organize the information so that the application can automatically assemble the panels using the structure of the files. The system is configured to allow the user to save the work (such as the specified sequence of panels) and in response, the system saves the file or data representing the file in non-transient memory or non-volatile memory that permits the user to later retrieve the work. The data can be saved for later retrieval locally, on the server, or both. and a file name can be assigned for use in retrieving the file from memory.

Components of the example graphical user interface system 100 of FIG. 1 may be implemented on one or more computer systems and be configured to communicate via a network connection. They all may also be implemented on one single computer system. In either situation, the computer system(s) can communicate with users' computers and customers' client devices. The computer system(s) may also be referred to as servers. The computer system(s), the user's computer, and the customer's client device may adopt the following computer system.

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are disclosed below in the context of FIG. 9.

Figure 9:
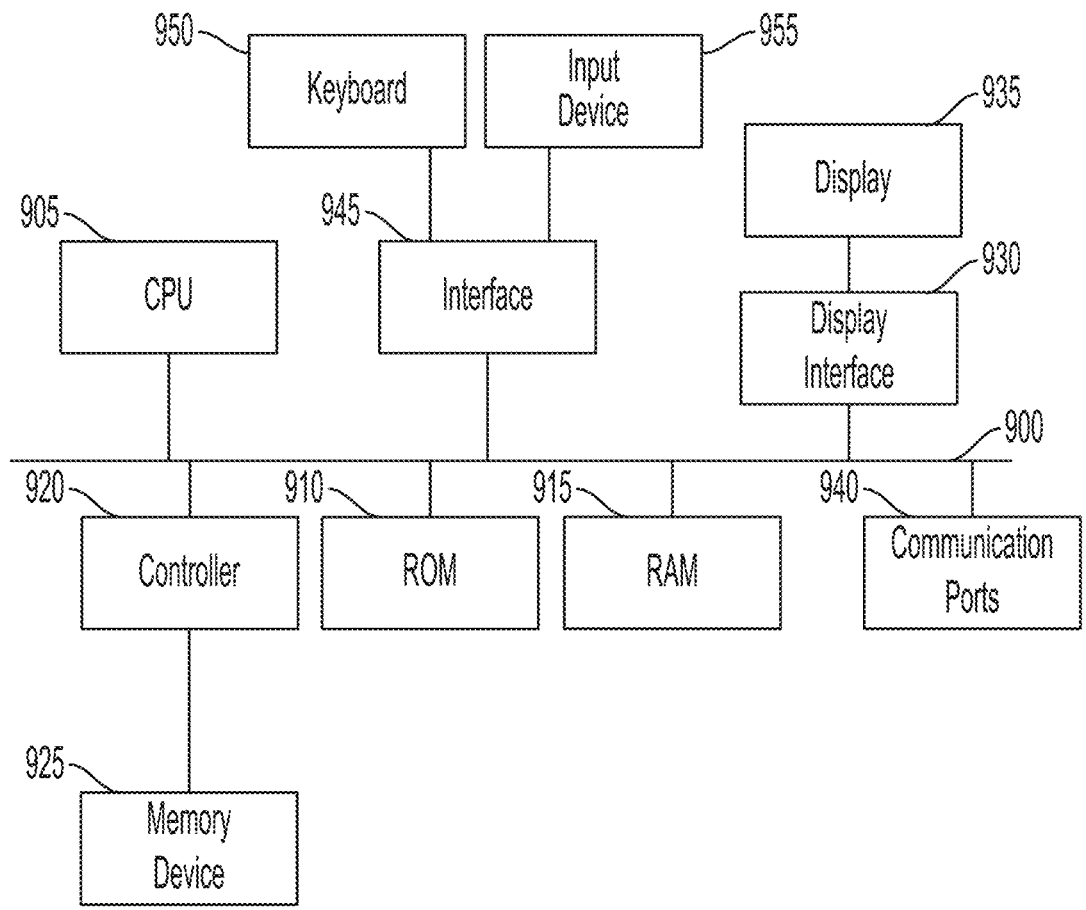
FIG. 9 depicts various embodiments of one or more electronic devices for implementing the various methods and processes described herein.

FIG. 9 depicts an example of internal hardware that may be included in any of the electronic components of the system, such as the user's smartphone or a local or remote computing device in the system. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM) 910, random access memory (RAM) 915, flash memory, hard drives and other devices capable of storing electronic data constitute examples of memory devices 925. A memory device may include a single device or a collection of devices across which data and/or instructions are stored. The memory device also may be used for storing temporary variables or other intermediate information during execution of instructions to be executed by processor. Such instructions, when stored in non-transitory storage media accessible to the processor, render computer system into a special-purpose machine that is customized to perform the operations specified in the instructions.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device 940 may be configured to be communicatively connected to a communications network, such as the Internet, a local area network or a cellular telephone data network.

The hardware may also include a user interface sensor 945 that allows for receipt of data from input devices 955 such as a keyboard 950, a mouse, a joystick, a touchscreen, a touch pad, a remote control, a pointing device and/or microphone. Digital image frames also may be received from a camera 920 that can capture video and/or still images, such as a high definition camera that incorporated into the user electronic device.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A computer-implemented system for data visualization that permits users to investigate, understand, and communicate information represented by complex graphs, the system comprising:

a processor;

a graph database configured to store a plurality of graphs, each graph comprising a plurality of graph elements comprising nodes, edges, and related properties; and a non-transitory memory that stores programming instructions that are configured to cause the processor to:

provide a user interface configured to provide an interactive visual workspace for the user in connection with the graph database, wherein the interactive visual workspace is configured to receive user input allowing a user to interactively add to the interactive visual workspace a subject graph comprising one or more nodes and edges from the graph database, whereby the interactive visual workspace allows the user to explore relationships among the nodes displayed in the user-added subject graph;

wherein the interactive visual workspace is configured to provide the user with an opportunity to interactively select, from the current interactive visual workspace, displayed nodes and edges to specify the selected displayed nodes and edges to be a displayed segment of the displayed nodes and edges shown in the displayed user-added subject graph, and to allow the user to repeat the interactive selection of displayed nodes and edges to specify the selected displayed nodes and edges to be additional displayed segments from the current interactive visual workspace; and wherein the processor is further configured, using the non-transitory memory, to:

in response to the selection of the displayed nodes and edges that specifies the displayed segment of the displayed nodes and edges shown in the displayed user-added subject graph, store the corresponding displayed segment comprising the selected displayed nodes and edges;

configure the user interface to allow the user, after the selection of one more of the displayed segments, to set a parameter that controls a sequence interrelationship among the selected displayed segments; and display a series of display regions in a sequence determined by the parameter, wherein each display a region is dedicated to provide a visual representation of a corresponding single one of the selected displayed segments, wherein the programming instructions that are configured to cause the processor to display the series of display regions comprises programming instructions that are configured to cause the processor to, in response to user input, rearrange the order of display regions in the series of display regions.

2. The computer-implemented system of claim 1, wherein the programming instructions that are configured to cause the processor to provide the user with the opportunity to interactively select displayed nodes and edges to specify the selected displayed nodes and edges to be a displayed segment of the displayed nodes and edges shown in the displayed user-added subject graph comprises programming instructions that are configured to cause the processor to provide the user with the opportunity to graphically select individual nodes of the subject graph that are displayed in the visual workspace.

3. The computer-implemented system of claim 1, wherein the programming instructions that are configured to cause the processor to display the series of display regions comprises programming instructions that are configured to cause the processor to automatically display one of the display regions in response to the user selection of the displayed segment.

4. The computer-implemented system of claim 1, wherein the programming instructions are further configured to cause the processor to, in response to user input, modify the parameter that controls the sequence interrelationship among the selected displayed segment.

5. The computer-implemented system of claim 1, wherein the programming instructions are further configured to cause the processor to, in response to user input, apply annotations to one or more of the selected displayed segments.

6. The computer-implemented system of claim 5, wherein the programming instructions that are configured to cause the processor to display the region dedicated to provide the visual representation of the corresponding single one of the selected displayed segments comprises programming instructions that are configured to display the annotations.

7. The computer-implemented system of claim 1, wherein the programming instructions that are configured to cause the processor to display the series of display regions comprises programming instructions configured to cause the processor to display an interactive graphical representation of a corresponding selected displayed segment.

8. The computer-implemented system of claim 7, wherein the programming instructions are further configured to cause the processor to display the corresponding displayed segment in a second user interface that allows user interaction with the the corresponding displayed segment, the second user interface being different than the user interface.

9. The computer-implemented system of claim 1, wherein the programming instructions that are configured to cause the processor to store the corresponding displayed segment comprises programming instructions that are configured to cause the processor to store in temporary storage the corresponding displayed segment comprising the selected displayed nodes and edges.

10. The computer-implemented system of claim 1, wherein the programming instructions that are configured to cause the processor to store the corresponding displayed segment comprises programming instructions that are configured to cause the processor to store in nontransient memory the corresponding displayed segment comprising the selected displayed nodes and edges.

11. The computer-implemented system of claim 1, wherein the programming instructions that are configured to cause the processor to display the series of display regions comprises programming instructions that are configured to cause the processor to, in response to the user selection of one of the displayed segments automatically add a new display region to the series of display regions.

12. A computer-implemented method of visualization graph data comprising:
providing an interactive visual workspace for a user in connection with a graph database, wherein the interactive visual workspace is configured to receive user input allowing the user to interactively add to the interactive visual workspace a subject graph comprising one or more nodes and edges from the graph database whereby the interactive visual workspace allows the user to explore relationships among nodes displayed in the user-added subject graph,
providing the user with an opportunity to interactively select from the current interactive visual workspace displayed nodes and edges to specify the selected displayed nodes and edges to be a displayed segment of the displayed nodes and edges shown in the displayed user-added subject graph, and to allow the user to repeat the interactive selection of displayed nodes and edges to specify the selected displayed nodes and edges to be additional displayed segments from the current interactive visual workspace;
displaying the user-added subject graph in the interactive visual workspace;
in response to the one or more selections of the displayed nodes and edges to specify the selected displayed nodes and edges to be a displayed segment of the displayed nodes and edges shown in the displayed user-added subject graph, making a copy of the corresponding displayed segment comprising the selected displayed nodes and edges;
allow the user, to set a parameter that controls a sequence interrelationship among the selected displayed segments;
displaying a series of display regions in a sequence determined by the parameter, wherein each display region provides a visual representation of a corresponding copy of a single one of the selected displayed segments;
in response to user input, rearranging the order of display regions in the series of display regions.

13. The method of claim 12, wherein displaying the series of display regions comprises automatically displaying one of the display regions in response to each user selection of the displayed segments.

14. The method of claim 12, further comprising storing in non-transient memory or temporary storage the corresponding displayed segment comprising the selected displayed nodes and edges.

15. The method of claim 12, further comprising, in response to user input, applying annotations to one or more of the selected displayed segments.

16. A non-transitory computer readable data medium storing computer-executable instructions that, when executed by a processor, cause the processor to:
provide an interactive visual workspace for a user in connection with a graph database, wherein the interactive visual workspace is configured to receive user input allowing the user to interactively add to the interactive visual workspace a subject graph comprising one or more nodes and edges from the graph database whereby the interactive visual workspace allows the user to explore relationships among nodes displayed in the user-added subject graph, wherein the interactive visual workspace is configured to provide the user with an opportunity to interactively select from the interactive visual workspace displayed nodes and edges to specify the selected displayed nodes and edges to be a displayed segment of the displayed nodes and edges shown in the displayed user-added subject graph, and to allow the user to repeat the interactive selection of displayed nodes and edges to specify the selected displayed nodes and edges to be additional displayed segments from the current interactive visual workspace;

display the user-added subject graph in the interactive visual workspace;

in response to one or more selections of the displayed nodes and edges to specify the selected displayed nodes and edges to be a displayed segment of the displayed nodes and edges shown in the displayed user-added subject graph, make a copy of the corresponding displayed segment comprising the selected displayed nodes and edges;

allow the user to set a parameter that controls a sequence interrelationship among the selected displayed segments;

display series of display regions in a sequence determined by the parameter, wherein each display region provides a visual representation of a corresponding copy of a single one of the selected displayed segments; and in response to user input, rearrange the order of display regions in the series of display regions.

17. The computer readable data medium of claim 16, wherein the instructions that cause the processor to display the series of display regions comprises instructions that cause the processor to automatically display one of the selected displayed segments in response to each user selection of the displayed segments.

18. The computer readable data medium of claim 16, wherein the instructions further cause the processor to store in nontransient memory or temporary storage the corresponding displayed segment comprising the selected displayed nodes and edges.

19. The computer readable data medium of claim 16, wherein the instructions further cause the processor to, in response to user input, apply annotations to one or more of the selected displayed segments.

* * * * *